(12) United States Patent
Huff

(10) Patent No.: US 6,691,234 B1
(45) Date of Patent: Feb. 10, 2004

(54) METHOD AND APPARATUS FOR EXECUTING INSTRUCTIONS LOADED INTO A RESERVED PORTION OF SYSTEM MEMORY FOR TRANSITIONING A COMPUTER SYSTEM FROM A FIRST POWER STATE TO A SECOND POWER STATE

(75) Inventor: Robert L. Huff, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 586 days.

(21) Appl. No.: 09/595,805

(22) Filed: Jun. 16, 2000

(51) Int. Cl.⁷ .................................. G06F 1/32
(52) U.S. Cl. ..................... 713/300; 713/1; 711/173
(58) Field of Search ................. 713/1, 300, 340; 711/100, 103, 170, 173, 202

(56) References Cited

U.S. PATENT DOCUMENTS

| | | | | |
|---|---|---|---|---|
| 5,987,536 A | * | 11/1999 | Johnson et al. | 710/36 |
| 6,052,793 A | * | 4/2000 | Mermelstein | 713/340 |
| 6,085,282 A | * | 7/2000 | Hansen et al. | 711/103 |
| 6,115,813 A | * | 9/2000 | Hobson et al. | 713/1 |
| 6,505,263 B1 | * | 1/2003 | Larson et al. | 710/100 |
| 6,510,488 B2 | * | 1/2003 | Lasser | 711/103 |

FOREIGN PATENT DOCUMENTS

JP  01261758 A  * 10/1989 ........... G06F/13/10

* cited by examiner

Primary Examiner—Thomas Lee
Assistant Examiner—Mark Connolly
(74) Attorney, Agent, or Firm—Blakely, Sokoloff, Taylor & Zafman LLP

(57) ABSTRACT

According to one aspect of the present invention, a method is provided in which a portion of system memory is reserved during a system boot operation for storing a set of instructions to be executed to transition a computer system from a first power state to a second power state. The reserved portion is made unavailable for use by an operating system of the computer system. The set of instructions stored in the reserved portion is executed to transition the computer system from the first power state to the second power state in response to a wakeup event.

31 Claims, 6 Drawing Sheets

METHOD AND APPARATUS FOR EXECUTING INSTRUCTIONS LOADED INTO A RESERVED PORTION OF SYSTEM MEMORY FOR TRANSITIONING A COMPUTER SYSTEM FROM A FIRST POWER STATE TO A SECOND POWER STATE

FIELD OF THE INVENTION

The present invention relates to the power and thermal management of computer systems and devices. More specifically, the present invention relates to an apparatus, method, and system for resuming from an Advanced Configuration and Power Interface (ACPI) S3 sleeping state using S3 resume code stored in a reserved portion of system memory.

BACKGROUND OF THE INVENTION

As computer devices and systems continue to advance and become more complex, effective and efficient power and thermal management of computer devices and systems have become more and more critical in system design and implementation. In general, computer devices are designed to have different operating modes or power states that correspond to different levels of performance and power consumption. A standard specification for computer power and thermal management system and interfaces is the advanced configuration and power interface (ACPI) specification, developed jointly by Intel Corporation of Santa Clara, Calif., Microsoft Corporation of Redmond, Wash., and Toshiba Corporation of Tokyo, Japan. The ACPI specification is one of the key elements in an operating system directed power management (OSPM). ACPI specification is a publicly available document and can be obtained via the Internet at [http://www.teleport.com/~acpi/]http://www.teleport.com/~acpi/.

The ACPI specification defines a number of global system states (Gx states) that apply to the entire system and are visible to the user. These various global system states include: (1) G0 global working state; (2) G1 global sleeping state; (2) G2 soft off state; and G3 mechanical off state. G0 working state is a computer state where the system dispatches user mode (application) threads and they execute. In this state, devices (peripherals) are dynamically having their power state changed. G1 sleeping state is a computer state where the computer consumes a small amount of power, user mode threads are not being executed, and the system "appears" to be off (from an end user's perspective, the display is off, etc.). Latency for returning to the working state varies upon the wakeup environment selected prior to entry of this state. Work can be resumed without rebooting the OS because large elements of system context are saved by the hardware and the rest by the system software. G2 soft off state is a computer state where the computer consumes a minimal amount of power. No user mode or system mode code is run. This state requires a large latency in order to return to the working state. The system's context will not be preserved by the hardware. The system needs to be restarted to return to the working state. G3 is a computer state that is entered and left by a mechanical means (e.g., turning off the system's power through the movement of a large switch, etc.). The ACPI also defines various device power states including a D0 device power state, a D1 device power state, D2 device power state, and D3 device power state. Device power states are states of particular devices and they are generally not visible to the user. The ACPI defines various processor power states that are processor power consumption and thermal management states within the global working state. These various processor power states include a C0 power state, a C1 power state, a C2 power state, and a C3 power state.

There are various types of sleeping states within the global sleeping state including S1, S2, S3, and S4 sleeping states. The S1 sleeping state is a low wake-up latency sleeping state. In this state, no system context is lost (CPU or chipset) and hardware maintains all system context. The S2 sleeping state is a low wake-up latency sleeping state except the CPU and system cache context is lost (the OS is responsible for maintaining the caches and CPU context). Control starts from the processor's reset vector after the wake-up event. The S3 sleeping state is a low wake-up latency sleeping state where all system context is lost except system memory. CPU, cache, and chipset context are lost in this state. Hardware maintains memory context and restores some CPU and L2 configuration context. Control starts from the processor's reset vector after the wake-up event. The S4 sleeping state is the lowest power, longest wake-up latency sleeping state supported by ACPI. In order to reduce power to a minimum, it is assumed that the hardware platform has powered off all devices.

In the ACPI S3 sleeping state, all system context is lost except system memory. Hardware maintains system memory context by placing the system memory in a self-refresh mode when power is removed from the system. One of the responsibilities of system BIOS during a resume or transition from an S3 sleeping state is to reinitialize the system and transfer control to the operating system (OS) waking vector without corrupting the OS image. This places an awkward requirement on system BIOS, which is to execute code without using the system memory. This requirement prevents the use of a stack, which is needed in order to develop resume code with a high level language. As a result, a typical BIOS S3 resume path includes tightly managed assembly code forced to execute from flash memory in order to avoid using system memory. Consequently, this approach has several disadvantages including: (1) an S3 resume implementation is resource limited because the amount of flash memory available for executing S3 resume code is limited; (2) use of the assembly low level language for S3 resume code does not allow for quick portability to a new architecture because assembly code cannot be simply recompiled by a compiler; and (3) the resume codes written in low level assembly language is not modular and less readable to engineers and/or programmers who need to maintain or enhance these codes.

BRIEF DESCRIPTION OF THE DRAWINGS

The features and advantages of the present invention will be more fully understood by reference to the accompanying drawings, in which.

DETAILED DESCRIPTION

In the following detailed description numerous specific details are set forth in order to provide a thorough understanding of the present invention. However, it will be appreciated by one skilled in the art that the present invention may be understood and practiced without these specific details.

In the discussion below, the teachings of the present invention are utilized to implement a method, apparatus, system, and machine-readable medium for transitioning a computer system from an ACPI S3 sleeping state to a higher power ACPI state. In one embodiment, a portion of the computer system memory is reserved by the system BIOS during a system boot. The reserved portion is used to store a set of instructions to be executed in order to transition the computer system from the ACPI S3 sleeping state to a higher power ACPI state (this set of instructions is also referred to as the S3 resume code herein). The reserved portion is made unavailable for use by the operating system. In one embodiment, in response to a wake up event, the S3 resume code is loaded from flash memory into the reserved portion of system memory. The S3 resume code stored in the reserved portion of the system memory is then executed to transition the computer system from the ACPI S3 sleeping state to a higher power state. In one embodiment, the system BIOS is configured to set a side a predetermined portion of system memory for storing the S3 resume code during the system boot process. The system BIOS is configured to indicate that an area of the system memory available for use by the operating system does not include the reserved portion. In one embodiment, the system BIOS maintains a system memory map to be accessed by the operating system for memory configuration information. The system memory map maintained by the BIOS tells the operating system which area of the system memory is available for use by the operating system which does not include the reserved portion. As a result, the system BIOS can utilize the reserved portion of system memory for execution of S3 resume code without corrupting the OS image stored in a different area of system memory. The teachings of the present invention are applicable to any scheme, method and system for power management and configuration in computer systems according to ACPI specification. However, the present invention is not limited to ACPI specification and can be applied to the power management and configuration in computer systems with respect to other specifications.

Figure 1:
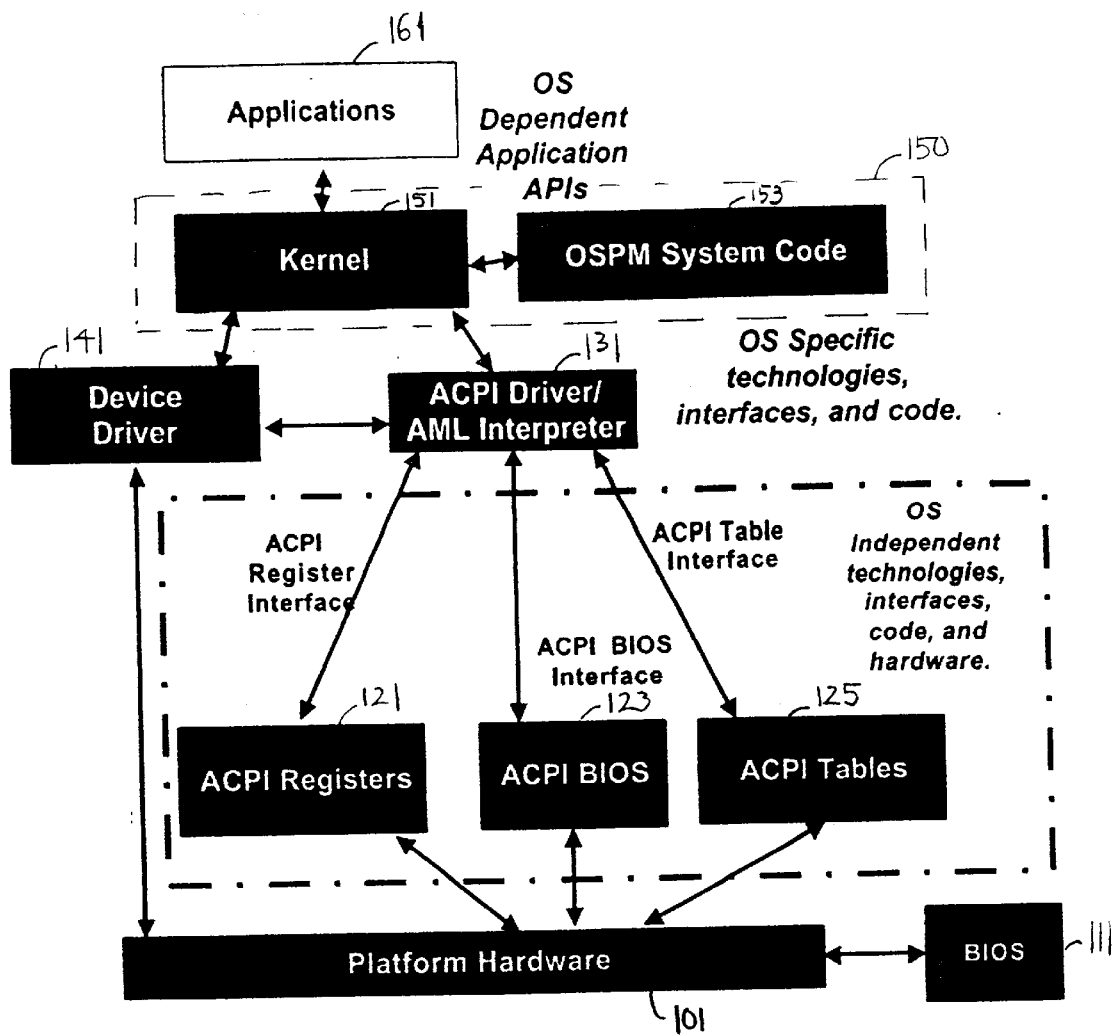
FIG. 1 is a block diagram of one embodiment of an OSPM/ACPI global system (FIG. 1—1 of ACPI spec)

FIG. 1 is a block diagram of one embodiment of a system architecture according to the ACPI specification, including various hardware and software components relevant to ACPI specification and their interactions. As shown in FIG. 1, the various hardware and software components include the platform hardware 101, BIOS 111, ACPI registers 121, ACPI BIOS 123, ACPI tables 125, and ACPI driver/AML (ACPI Machine Language) interpreter 131. The system illustrated in FIG. 1 further includes device driver(s) 141, an operating system 150 that includes a system kernel 151 and an OSPM system code 153, and applications 161 that are controlled by the operating system 150. The ACPI tables 125, the ACPI registers 121, and the ACPI BIOS 123 are the runtime components to ACPI. The ACPI tables 125 are used to describe the interfaces to the hardware. ACPI tables can make use of a p-code type of language, the interpretation of which is performed by the OS. In one embodiment, the OS contains and uses an AML interpreter 131 that executes procedures encoded in AML and stored in the ACPI tables 125. The BIOS 111 acts as an interface between the hardware and the operating system. In general, the BIOS 111 is responsible for configuring hardware settings, booting up the system, and providing various other system services and functions. Software programs and peripheral devices use interrupts to access BIOS services. When an interrupt occurs, control of the system is transferred to an interrupt handling routine. These routines are either interrupt service routines (ISRs) or device service routines (DSRs). An ISR handles interrupts issued by hardware devices whereas a DSR handles software interrupts issued by INT instructions. One of the important functions performed by the BIOS 111 is to boot up the system and configure the system hardware during the boot process including system memory configuration. During a system transition from an ACPI S3 sleeping state to a higher power ACPI state, the BIOS 111 is responsible for reinitializing the system and transferring control to the OS waking vector without corrupting the OS image. These BIOS functions are described in more detail below.

Figure 2:
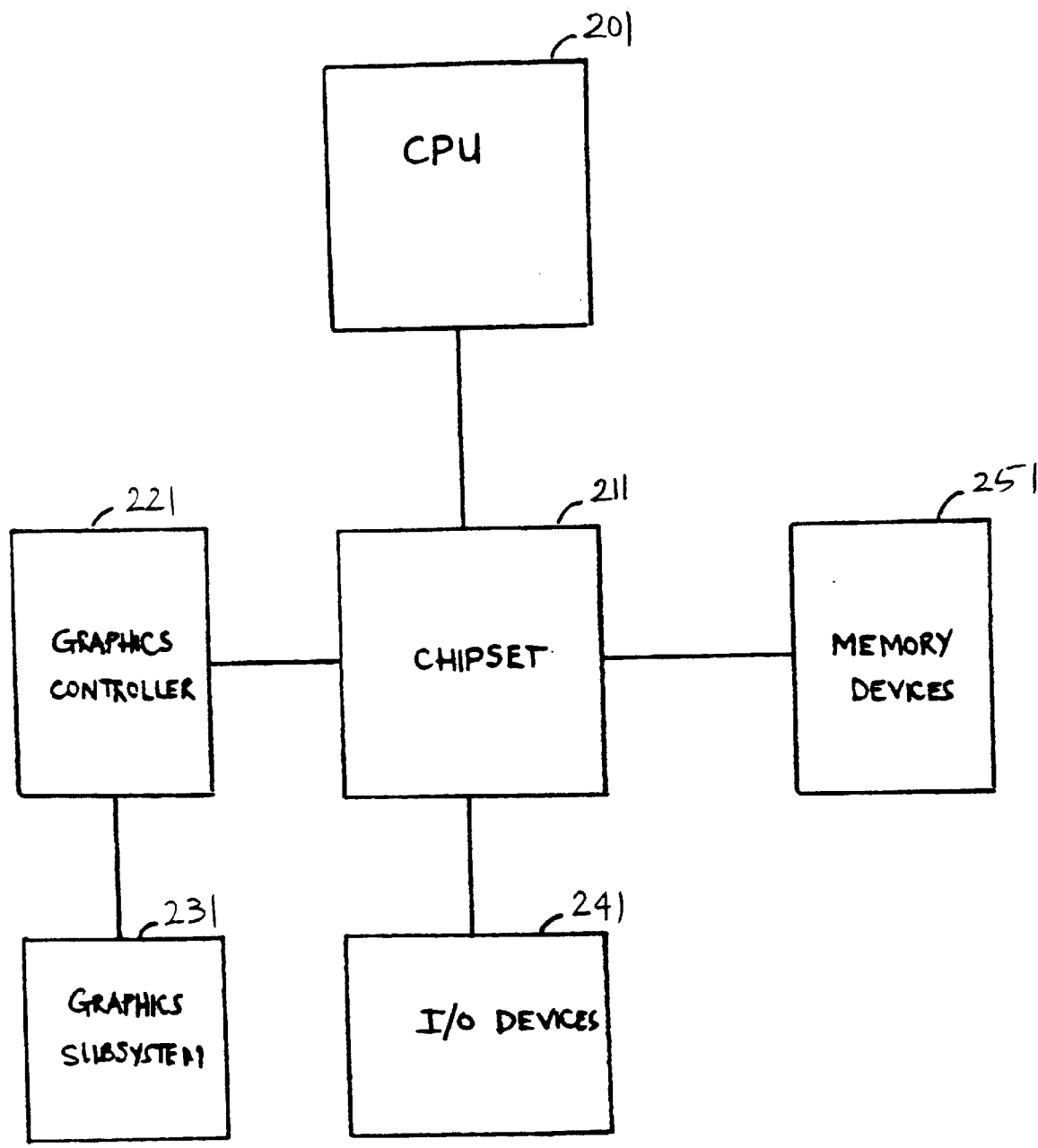
FIG. 2 shows a block diagram of one embodiment of a system configuration in which the teachings of the present invention are implemented.

FIG. 2 shows a block diagram of one embodiment of a system configuration 200 in which the teachings of the present invention are implemented. The system configuration 200 includes a central processing unit (CPU) 201, a chipset unit 211, a graphics controller 221 coupled to a graphics subsystem 231, I/O devices 241, and a plurality of memory devices 251. For the purposes of the present specification, the term "processor" or "CPU" refers to any machine that is capable of executing a sequence of instructions and shall be taken to include, but not be limited to, general purpose microprocessors, special purpose microprocessors, multi-media controllers and microcontrollers, etc. In one embodiment, the CPU 201 is a general-purpose microprocessor that is capable of executing an Intel Architecture instruction set. In one embodiment, the chipset unit 211 may include a memory control unit (not shown) that is responsible for servicing memory transactions that target the system memory devices 251. In another embodiment, the memory control unit can be a stand-alone unit, or an integrated part of some larger unit that control the interface between various system components and the system memory devices 251. In one embodiment, the chipset unit 211 may also include an I/O control unit (not shown) that provides the interface control between the memory unit control unit and various I/O devices 241 including PCI slots, PCI agents, a plurality of USB ports, a plurality of IDE ports, and other IO devices. The AGP graphics control unit 221 provides the interface control between the graphics subsystem 231 and the chipset unit 211.

Figure 3:
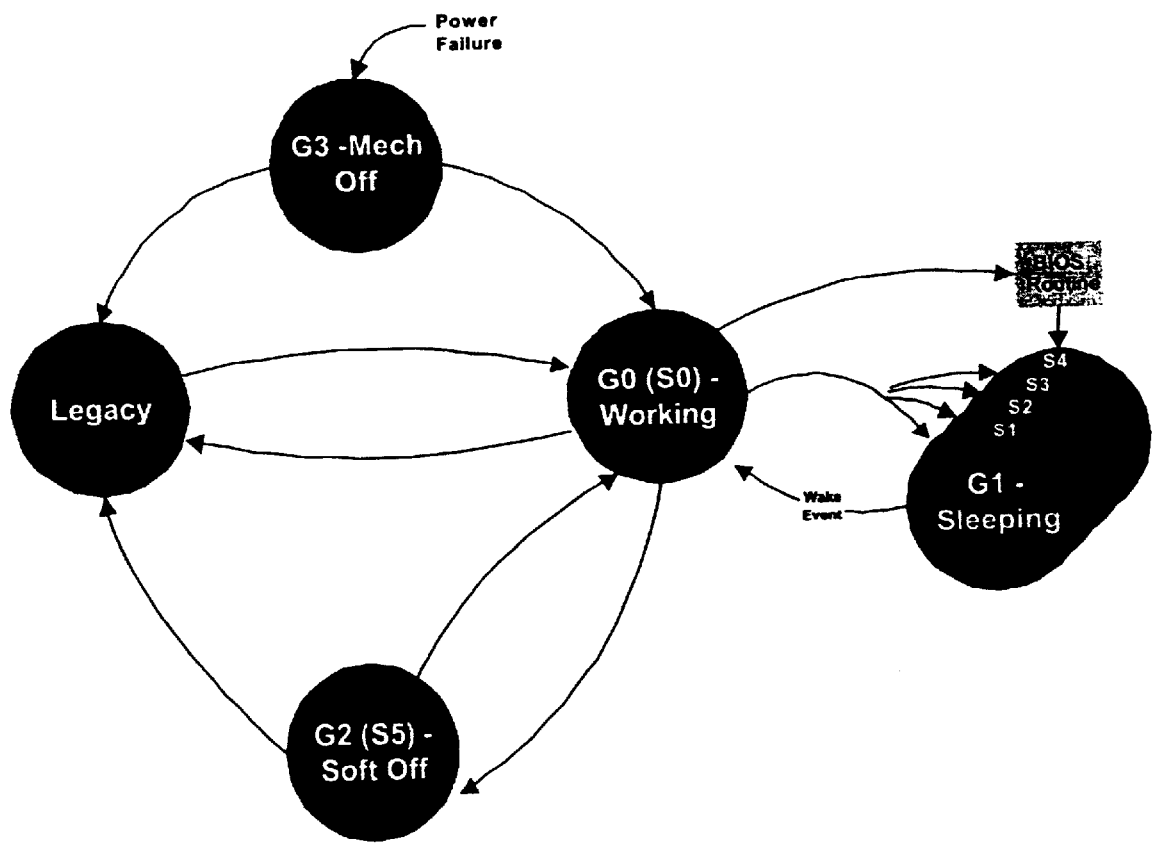
FIG. 3 is a state diagram illustrating the transitions between various power states in accordance with the ACPI specification.

FIG. 3 shows a state diagram illustrating the transitions of a computer system between various power states in accordance with ACPI specification. As mentioned above, the ACPI specification defines a number of global system states (Gx states) that apply to the entire system and are visible to the user. These various global system states include: (1) G0 global working state; (2) G1 global sleeping state; (2) G2 soft off state; and G3 mechanical off state. G0 working state is a computer state where the system dispatches user mode (application) threads and they execute. In this state, devices (peripherals) are dynamically having their power state changed. G1 sleeping state is a computer state where the computer consumes a small amount of power, user mode threads are not being executed, and the system "appears" to be off (from an end user's perspective, the display is off, etc.). Latency for returning to the working state varies upon the wakeup environment selected prior to entry of this state. Work can be resumed without rebooting the OS because large elements of system context are saved by the hardware and the rest by the system software. G2 soft off state is a computer state where the computer consumes a minimal amount of power. No user mode or system mode code is run. This state requires a large latency in order to return to the working state. The system's context will not be preserved by the hardware. The system needs to be restarted to return to the working state. G3 is a computer state that is entered and left by a mechanical means (e.g., turning off the system's power through the movement of a large switch, etc.) It is implied by the entry of this off state through a mechanical means that no electrical current is running through the circuitry. The OS must be restarted to return to the working state. There are various types of sleeping states within the global sleeping state. These various sleeping states include: (1) S1 sleeping state; (2) S2 sleeping state; (3) S3 sleeping state; and (4) S4 sleeping state. The S1 sleeping state is a low wake-up latency sleeping state. In this state, no system context is lost (CPU or chipset) and hardware maintains all system context. The S2 sleeping state is a low wake-up latency sleeping state except the CPU and system cache context is lost (the OS is responsible for maintaining the caches and CPU context). Control starts from the processor's reset vector after the wake-up event. The S3 sleeping state is a low wake-up latency sleeping state where all system context is lost except system memory. CPU, cache, and chipset context are lost in this state. Hardware maintains memory context and restores some CPU and L2 configuration context. Control starts from the processor's reset vector after the wake-up event. The S4 sleeping state is the lowest power, longest wake-up latency sleeping state supported by ACPI. In order to reduce power to a minimum, it is assumed that the hardware platform has powered off all devices. Platform context is maintained. From a user-visible level, the system can be thought of as being in one of the states shown in FIG. 3. In general use, the system alternates between the working states and the sleeping states. In the working state, the computer performs some work. User-mode application threads are dispatched and running. Individual devices can be in low-power states and the processor(s) can be in low power states if they are not being used. Any device that is turned of by the system because it is not actively in use can be turned on with short latency. In one embodiment, when the computer system is idle or the user has pressed the power button, the OS will put the system into one of the various sleeping states shown in FIG. 3. No user-visible computation occurs in a sleeping state. The various sleeping states shown in FIG. 3 differ in what events can arouse the system to a working state and how long this takes. Computers that support legacy BIOS power management boot in the legacy state and transition to the working state when an ACPI OS loads. A system without legacy support transitions directly from the mechanical off state to the working state.

As described above, the S3 sleeping state is defined as a low wakeup latency sleep state, where all system context is lost except for system memory. CPU, cache, and device context are lost in this state. The OS and drivers restore device context. Hardware maintains memory context and restores some CPU and L2 configuration context. Control starts from the processor's reset vector after a wakeup event. The hardware is also responsible for maintaining chipset and memory context. According to ACPI specification, the hardware implements an S3 state by performing the following:

Memory is placed into a low power auto or self refresh mode.

Devices that are maintaining memory isolate themselves from other devices in the system.

Power is removed from the system. At this point, only devices that support memory are powered.

In this case, a wakeup event re-powers the system and resets most devices, depending on the implementation. Execution control starts from the CPU's boot vector. Some of the tasks performed by the BIOS in response to a wakeup event include the following:

Program the initial boot configuration of the CPU.

Initialize the cache controller to its initial boot size and configuration.

Enable the memory controller to accept memory accesses.

Jump to the waking vector.

As described above, during a resume from an S3 sleeping state, the system BIOS is responsible for reinitializing the system and transferring control to the OS waking vector without corrupting the OS image. This places an awkward requirement on system BIOS, which is to execute code without using the system memory. This requirement prevents the use of a stack, which is needed in order to develop resume code with a high level language. As a result, a typical BIOS S3 resume path includes tightly managed assembly code forced to execute from flash memory in order to avoid using system memory. Consequently, this approach has several disadvantages including: (1) an S3 resume implementation is resource limited because the amount of flash memory available for executing S3 resume code is limited; (2) use of the assembly low level language for S3 resume code does not allow for quick portability to a new architecture because assembly code cannot be simply recompiled by a compiler; and (3) the resume codes written in low level assembly language is not modular and less readable to engineers and/or programmers who need to maintain or enhance these codes.

To solve the problem described above, the present invention provides a method and a mechanism to allow the system BIOS to reserve and utilize a portion of the system memory for execution of the S3 resume code when the system wakes from an S3 sleeping state. This reserved portion of the system memory is made unavailable for use by the operating system. Thus, the system BIOS is free to use this reserved portion for execution of the S3 resume code without corrupting the OS image. In one embodiment, in order to make the reserved portion unavailable for use by the operating system, the system BIOS after configuring the system memory during the system boot process maintains a system memory configuration map which indicates that the system memory area that is available for use by the operating system does not include the reserved portion for the S3 resume code. In one embodiment, in order to make the operating system unaware of the reserved portion, the system BIOS modifies the top of memory information reported to the operating system via the following INT15 calls: INT15-88, INT15-E801, INT15-E820. These INT functions/subroutines are well-defined runtime functions and are well known in the art. They are used by the operating system to obtain memory configuration information. In ACPI environment, the INT15 interface is required by the ACPI specification to provide the operating system with a system memory map. Specifically, the INT15-88 function returns the size of extended memory (memory above 1 MB). The INT15-E801 function returns the amount of currently installed memory. Specifically, this function, when invoked, will return information with respect to the memory installed between 1 MB and 16 MB, memory installed above 16 MB, memory configured between 1 MB and 16 MB, and memory configured above 16 MB. The function INT15-E820 returns a memory map of all installed RAM and all physical memory ranges reserved by the BIOS. The information returned by this function supersedes the information obtained from the INT15-88 (Return Size of Extended Memory) or the INT15-E801 (Get Memory Size). By modifying the top of memory information reported to the operating system via the INT15 interface, the operating system is unaware of the reserved portion and will leave this area unmodified. The system BIOS then can utilize this reserved area during an S3 resume for code execution without corrupting the OS image.

Figure 4:
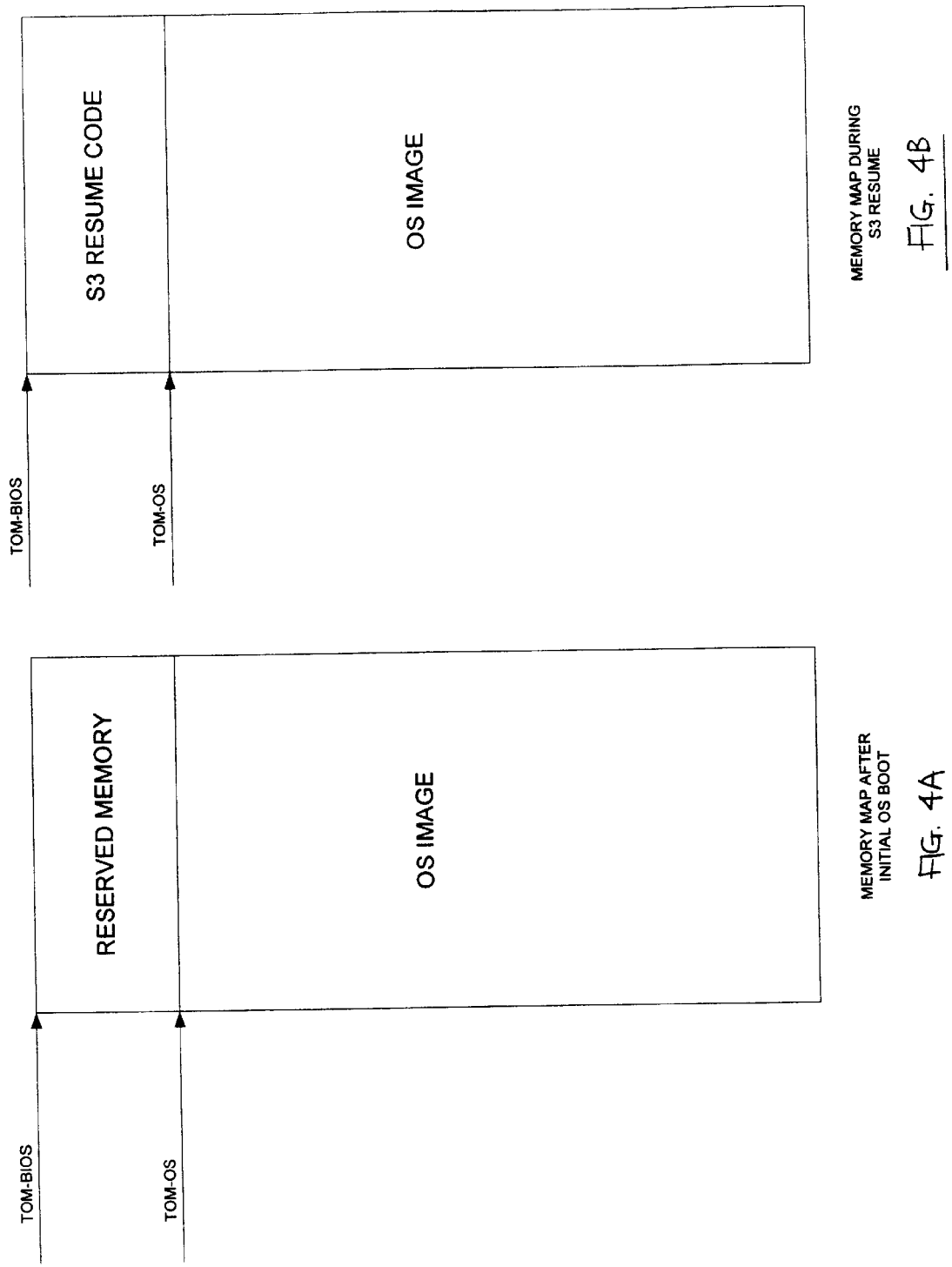
FIGS. 4A and 4B show an example of a memory map according to the teachings of the present invention.

FIGS. 4A and 4B show an example of a memory map according to the teachings of the present invention. As shown in these figures, one area of the system memory is reserved by the BIOS during the system boot process. This reserved area is utilized by the system BIOS during an S3 resume for code execution without corrupting the OS image. The size of the reserved area is based upon the size of the S3 resume code and may vary depending upon various implementations. The TOM-BIOS field is the top of memory field that is used by the system BIOS whereas the TOM-OS field is the top of memory field reported to the operating system. If TOM-OS is reported to the operating system instead of TOM-BIOS via the well-defined INT15 interface, the operating system is not aware of the reserved memory area and will leave this area unmodified. The OS image will be loaded in the specified memory having the TOM-OS as the upper boundary. Accordingly, during an S3 resume, the system BIOS can load the S3 resume code from flash memory into the reserved area for execution without disturbing the OS image stored in a different memory area. There are several advantages provided by the present invention. First of all, based on the utilization of a reserved area in system memory for S3 code execution, S3 resume implementation is no longer resource limited because memory resources in modem systems are readily available. This will allow for S3 code generation using a high level language and utilization of memory management schemes such as paging. In addition, the use of high level language for resume code allows for quick portability to a new architecture or upgrades. Resume code written in high level languages can be recompiled by a compiler, as opposed to being rewritten by developers when porting from one architecture to another (e.g., IA-32 to IA-64). Furthermore, resume code written in a high level language is much more maintainable because the resulting source code is modular and more readable.

Figure 5:
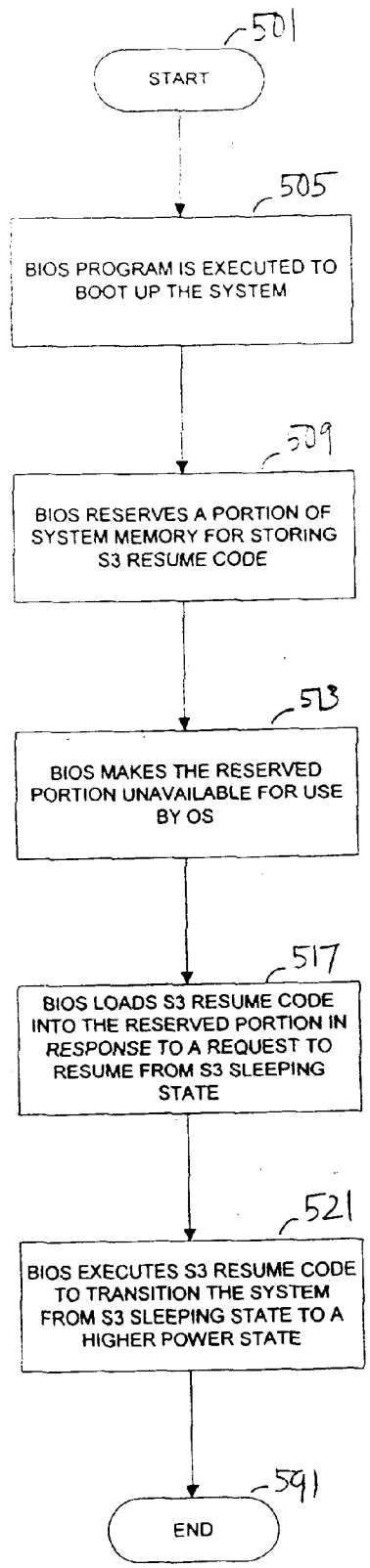
FIG. 5 shows a flow diagram of one embodiment of a method according to the teachings of the present invention.

FIG. 5 shows a flow diagram of one embodiment of a method according to the teachings of the present invention. At block 505, the system is powered on and the system BIOS program is executed to boot up the system. At block 509, the BIOS configures the system memory and reserves a portion of the system memory for storing S3 resume code. As described above, the size of the reserved portion is based upon the size of the S3 resume code and may vary depending on various implementations. At block 513, the reserved area is made unavailable for use by the operating system. As described above, in one embodiment, in order to make the operating system unaware of the reserved portion, the system BIOS modifies the top of memory information reported to the operating system via the following INT15 calls: INT15-88, INT15-E801, INT15-E820. Accordingly, OS image will be loaded into a specified area in the system memory that does not include the reserved portion. At block 517, assuming that the system has been placed into an S3 sleeping state, the system BIOS loads S3 resume code into the reserved portion in response to a wakeup event to resume from S3 sleeping state. At block 521, the system BIOS executes the S3 resume code to transition the system from S3 sleeping state to a higher power state.

Figure 6:
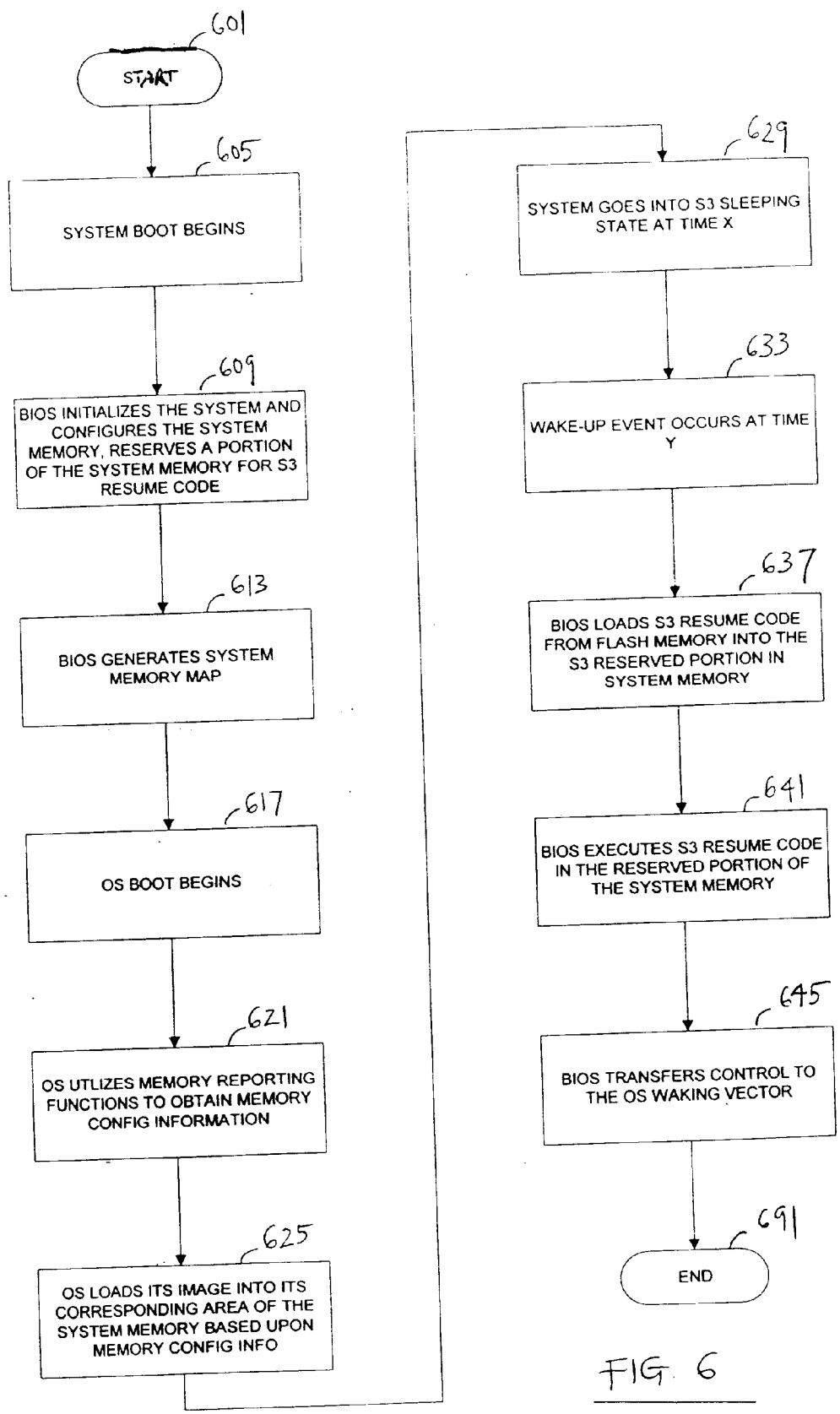
FIG. 6 shows a flow diagram of one embodiment of a method according to the teachings of the present invention.

FIG. 6 shows a flow diagram of one embodiment of a method according to the teachings of the present invention. The system boot begins at block 605. At block 609, the system is initialized, the system memory is configured and a portion of the system memory is reserved for storing S3 resume code. At block 613, a system map containing system memory configuration information is generated. At block 617, the OS boot begins. At block 621, the OS utilizes the memory reporting functions (i.e., the INT15 interface) to obtain memory configuration information. At block 625, the OS loads its image into its corresponding area of system memory which does not include the reserved portion for the S3 resume code. At block 629, the system goes into an S3 sleeping state at some point in time (time X). At block 633, a wakeup event occurs at another point in time (time Y). At block 637, in response to the wakeup event, the BIOS loads the S3 resume code from flash memory into the S3 reserved portion in system memory. At block 641, the S3 resume code is executed to resume the system from the S3 sleeping state. At block 645, the BIOS transfers control to the OS waking vector.

The invention has been described in conjunction with the preferred embodiment. It is evident that numerous alternatives, modifications, variations and uses will be apparent to those skilled in the art in light of the foregoing description.

What is claimed is:

1. A method comprising:
   reserving a portion of system memory during a system boot operation for storing a set of instructions to be executed to transition a computer system from a first power state to a second power state;
   making the reserved portion unavailable for use by an operating system of the computer system;
   executing the set of instructions stored in the reserved portion to transition the computer system from the first power state to the second power state in response to a wakeup event; and
   in response to the wakeup event, loading the set of instructions from a flash memory into the reserved portion of system memory.

2. The method of claim 1 wherein the system is compatible with the Advanced Configuration and Power Interface (ACPI) specification.

3. The method of claim 2 wherein the first power state is ACPI S3 sleeping state and the second power state is a higher power state than the ACPI S3 sleeping state.

4. The method of claim 1 wherein reserving comprises:
   configuring the system memory during the system boot operation including allocating a predetermined portion of the system memory for storing the set of instructions.

5. The method of claim 4 wherein configuring comprises:
   configuring a basic input/output system (BIOS) program to set aside the predetermined portion of the system's memory during the system boot operation; and
   configuring the BIOS program to indicate that the memory available for use by an operating system does not include the reserved portion.

6. The method of claim 5 wherein making the reserved portion unavailable comprises:
   in response to the operating system's request for the system memory configuration information, reporting that a system memory area available for use by the operating system does not include the reserved portion.

7. The method of claim 5 wherein configuring the BIOS program to indicate that the reserved portion is not available for use by the operating system comprises:

maintaining a system memory configuration map that includes information about the size and the location of a system memory area that is available for use by the operating system.

8. The method of claim 1 wherein the size of the reserved portion is determined based on the size of the set of instructions.

9. A method as recited in claim 1, wherein the set of instructions is resume code, the resume code being developed in a high level language, allowing portability to a new architecture.

10. A method as recited in claim 9, wherein the resume code is modular.

11. A method as recited in claim 9, wherein the resume code utilizes stack management.

12. A basic input/output system (BIOS) in a computer system comprising:

logic to reserve a portion of a system memory during a system boot process for storing a set of instructions to be executed to transition the computer system from a first power state to a second power state;

logic to make the reserved portion unavailable for use by an operating system of the computer system;

logic to execute the set of instructions to transition the computer system from the first power state to the second power state; and logic to load the set of instructions from a flash memory into the reserved portion of system memory in response to a wakeup event.

13. The BIOS of claim 12 wherein logic to reserve comprises:

logic to configure the system memory during the system boot process to designate a predetermined portion of the system memory to be used for storing the set of instructions.

14. The BIOS of claim 12 wherein logic to make the reserved portion unavailable comprises:

logic to maintain system memory configuration information which indicates that an area of system memory that is available for use by the operating system does not include the reserved portion.

15. The BIOS of claim 12 wherein the computer system is compatible with the Advanced Configuration and Power Interface (ACPI) specification.

16. The BIOS of claim 15 wherein the first power state is ACPI S3 sleeping state and the second power state is a higher power state than the ACPI S3 sleeping state.

17. A basic input/output system (BIOS) in a computer system as recited in claim 12, wherein the set of instructions is resume code, the resume code being developed in a high level language, allowing portability to a new architecture.

18. A basic input/output system (BIOS) in a computer system as recited in claim 17, wherein the resume code is modular.

19. A basic input/output system (BIOS) in a computer system as recited in claim 17, wherein the resume code utilizes stack management.

20. A computer system comprising:

a processor;

a system memory coupled to the processor;

an operating system; and a BIOS program comprising:

logic to reserve a portion of the system memory during a system boot process for use by the BIOS;

logic to make the reserved portion unavailable for use by the operating system;

logic to utilize the reserved portion for executing a set of instructions to transition the system from a first power state to a second power state; and logic to load the set of instructions from a flash memory into the reserved portion in response to a wakeup event.

21. The computer system of claim 20 wherein the computer system is compatible with the Advanced Configuration and Power Interface (ACPI) specification.

22. The computer system of claim 20 wherein the first power state is ACPI S3 sleeping state and the second power state is a higher power state than the ACPI S3 sleeping state.

23. A computer system as recited in claim 20, wherein the set of instructions to transition the system from a first power state to a second power state is resume code, the resume code being developed in a high level language, allowing portability to a new architecture.

24. A computer system as recited in claim 23, wherein the resume code is modular.

25. A computer system as recited in claim 23, wherein the resume code utilizes stack management.

26. A machine-readable medium which, when executed by a machine, causes the machine to perform operations comprising:

reserving a portion of system memory during a system boot operation for storing a set of instructions to be executed to transition a computer system from a first power state to a second power state, wherein the set of instructions is loaded from a flash memory into the reserved portion in response to a wakeup event;

making the reserved portion unavailable for use by an operating system of the computer system; and executing the set of instructions stored in the reserved portion to transition the computer system from the first power state to the second power state in response to a wakeup event.

27. The machine-readable medium of claim 26 wherein the computer system is compatible with the Advanced Configuration and Power Interface (ACPI) specification.

28. The machine-readable medium of claim 27 wherein the first power state is ACPI S3 sleeping state and the second power state is a higher power state than the ACPI S3 sleeping state.

29. A machine-readable medium as recited in claim 26, wherein the set of instructions to be executed to transition a computer system from a first power state to a second power state is resume code, the resume code being developed in a high level language, allowing quick portability to a new architecture.

30. A machine-readable medium as recited in claim 29, wherein the resume code is modular.

31. A machine-readable medium as recited in claim 29, wherein the resume code utilizes stack management.

* * * * *

UNITED STATES PATENT AND TRADEMARK OFFICE
CERTIFICATE OF CORRECTION

| | |
|---|---|
| PATENT NO. | : 6,691,234 B1 |
| DATED | : February 10, 2004 |
| INVENTOR(S) | : Huff |

It is certified that error appears in the above-identified patent and that said Letters Patent is hereby corrected as shown below:

Column 7,
Line 34, delete "modem", insert -- modern --.

Signed and Sealed this

Twenty-second Day of June, 2004

JON W. DUDAS
*Acting Director of the United States Patent and Trademark Office*